Aug. 22, 1961     G. BANISTER     2,996,933
POWER STEERING SYSTEM FOR SKID STEERED VEHICLES
Filed Oct. 20, 1959     4 Sheets-Sheet 1

INVENTOR.
GUY BANISTER
ATTORNEYS

INVENTOR.
GUY BANISTER

BY
ATTORNEYS

Aug. 22, 1961  G. BANISTER  2,996,933
POWER STEERING SYSTEM FOR SKID STEERED VEHICLES
Filed Oct. 20, 1959  4 Sheets-Sheet 3

INVENTOR.
GUY BANISTER

BY
ATTORNEYS

United States Patent Office 2,996,933
Patented Aug. 22, 1961

2,996,933
POWER STEERING SYSTEM FOR SKID STEERED VEHICLES
Guy Banister, Aurora, Ill., assignor to Barber-Greene Company, Aurora, Ill., a corporation of Illinois
Filed Oct. 20, 1959, Ser. No. 847,533
4 Claims. (Cl. 74—710.5)

This invention relates to improvements in asphalt paver finishers and more particularly relates to an improved form of power steering means therefor.

In asphalt paver finishers, the paver finisher is continually pushing a heavy truck during the paving operation, which maintains the paver finisher supplied with asphalt. The machine is also frequently working on slippery surfaces and on side slopes where the pavement is super-elevated, or on hills. These conditions all require fine and uniform steering control, for any irregularity in steering leaves a permanent irregularity in the pavement.

Heretofore, the steering of paver finishers has been attained by momentarily disengaging the drive to the traction devices on one side of the paver finisher or the other, resulting in a series of straight line movements of the paver finisher to make a turn, all veering off from the guide line for the pavement at angles.

This is due to the fact that it is difficult to slip the clutches to the required degree to attain uniform steering, and is accentuated with the use of power operated clutches, because with such clutches, the clutches cannot be slipped to the various degrees required to make a uniform turn.

It has been attempted to remedy this by providing mechanical drives to each side of the paver finisher through a differential and brakes; through multi-speed planetaries and brakes; or various other drive combinations giving a fixed relative speed differential between each side of the paver finisher, as well as through individual engines with individual speed controls or independent drives to each side, through power conversion units with individual speed control.

These attempts have not been satisfactory because where a differential or multi-speed planetaries or other combinations giving a fixed relative speed differential between each side are used, and brakes are employed to control operation of the planetaries or differentials, it is not possible to have an infinitely variable speed change, and such steering methods and particularly those employing clutches and brakes in the control continually disconnect power to one side or the other with a resultant loss of overall traction ability.

Where dual power sources are used, accuracy in turning can be attained, but the cost and space requirements render such steering methods impractical, while the power conversion methods heretofore used add to the total power requirements and materially add to the cost of building and operating the paver finishers.

A principal object of the present invention, therefore, is to remedy the foregoing disadvantages by providing an improved form of power steering system in which steering is attained by providing an infinitely variable speed drive to each traction device, increasing the speed of one traction device and decreasing the speed of the other traction device for turning in one direction or another and driving the traction devices at the same rates of speed for travel in a straight ahead direction, all under control of a steering wheel.

A further object of the invention is to provide an improved form of skid steered power steering system, particularly adapted for steering paver finishers by power, utilizing individual epicyclic transmission devices for driving the traction devices on each side of the paver finisher at infinitely variable speeds, in which each epicyclic transmission device is automatically locked to serve as a fixed reduction to the final drive when not steering, and it is desired that the paver finisher travel in a straight line.

Another object of the invention is to provide a power steering system particularly adapted for paver finishers, in which infinitely variable epicyclic transmissions are provided for driving the traction devices on each side of the vehicle, and a variable speed reversible motor, operated under control of the steering wheel, is provided to vary the speeds of travel of the traction devices by oppositely varying the output speeds of the epicyclic transmissions.

Still another object of the invention is to provide an improved form of power steering system particularly adapted for asphalt pavers and the like, utilizing infinitely variable epicyclic gear trains for driving the traction devices on each side of the paver finisher, in which a variable speed reversible motor controls the drive through the epicyclic gear trains by speeding up the output speed of one gear train, and reducing the output speed of the other gear train, all under the control of a single steering wheel.

These and other objects of the invention will appear from time to time as the following specification proceeds and with reference to the accompanying drawings wherein:

FIGURE 3 is a horizontal sectional view taken through the support casing for the traction devices, in order to show the support and drive therefor;

Figure 1:
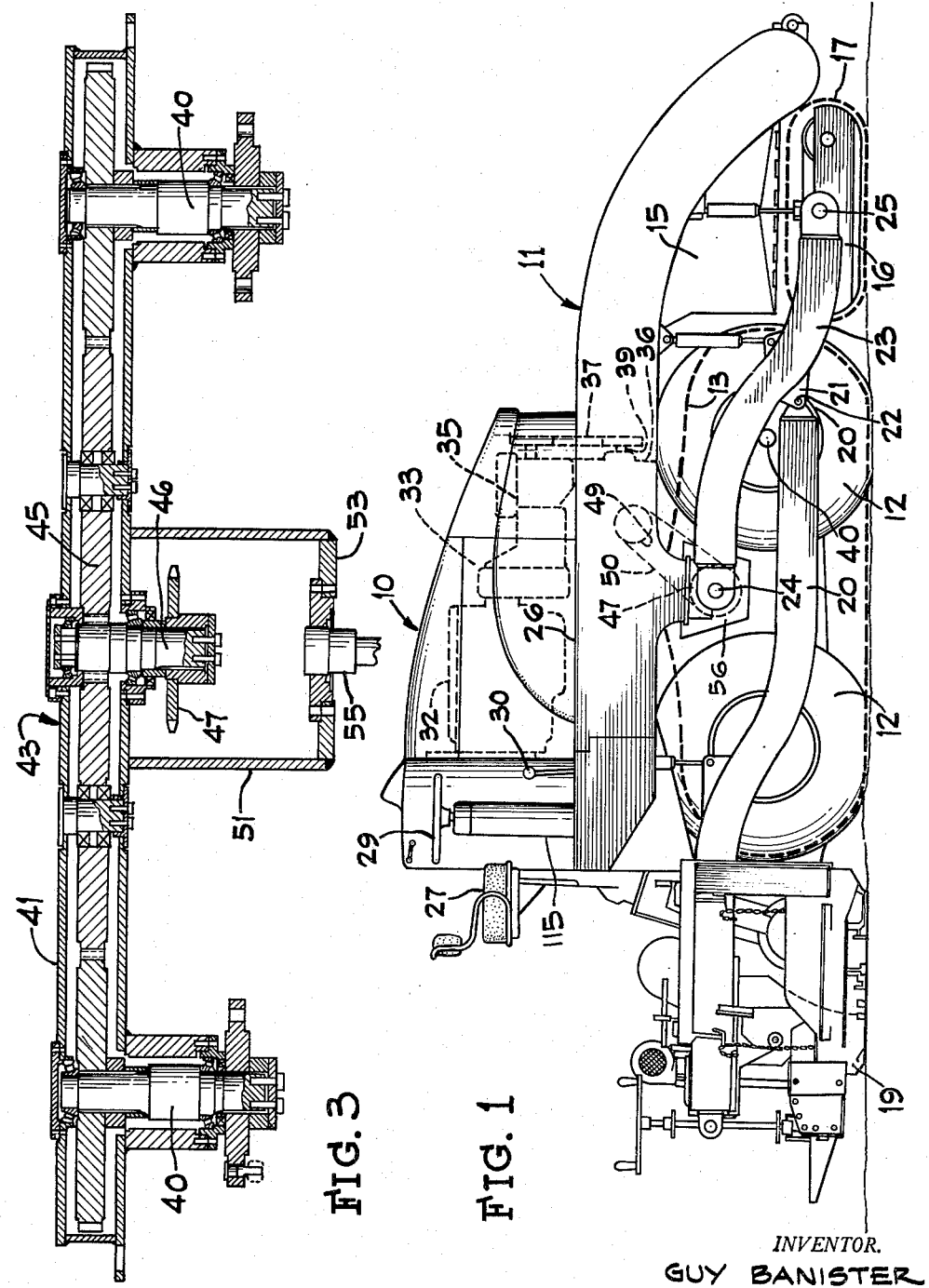
FIGURE 1 is a generally diagrammatic view in side elevation of a road paver finisher constructed in accordance with the invention.

In the embodiment of the invention illustrated in the drawings, the machine, as shown in FIGURE 1, generally comprises a traction unit 10 including a main frame 11 mounted on traction devices, such as rubber tired wheels 12. The traction unit may also be interchangeably mounted on continuous traction tread devices designated by dashed lines and indicated generally by a reference character 13.

The rubber tired wheels 12 and the traction devices 13 are readily interchangeable to suit various paving conditions, as shown and described in an application Serial No. 838,284, assigned to the assignee of the present invention and filed by Harry A. Barber and James F. Sauer on September 4, 1959 and entitled "Road Finishing Machine," so not herein shown or described further, it being understood that steering is effected on the same general principles when the machine is propelled by either rubber tired wheels or continuous traction tread devices.

The machine also has a hopper 15 for hot asphalt, extending for substantially the length of the main frame 11 and supported when loaded with asphalt on an auxiliary load bearing unit 16, mounted on laterally spaced traction tread devices 17, as shown and described in the aforementioned application of Harry A. Barber and James F. Sauer, so not herein shown or described further.

The machine also includes a screed or tamper and strike-off unit 19 spaced rearwardly of the rear end portion of the main frame 11 and the discharge end portion of the hopper 13, and suspended from laterally spaced leveling arms 20 extending forwardly along the main frame 11 along the outsides of the wheels 12 and pivotally connected at their forward ends to lugs 21 on pivot pins 22.

The lugs 21 extend from auxiliary front arms 23 transversely pivoted to opposite sides of the main frame 11 on pivot pins 24 along the outsides of the forward wheels 12, and pivotally secured at their forward ends to the auxiliary load bearing unit 16 on pivot pins 25, as in the aforementioned application of Harry A. Barber and James F. Sauer.

Figure 2:
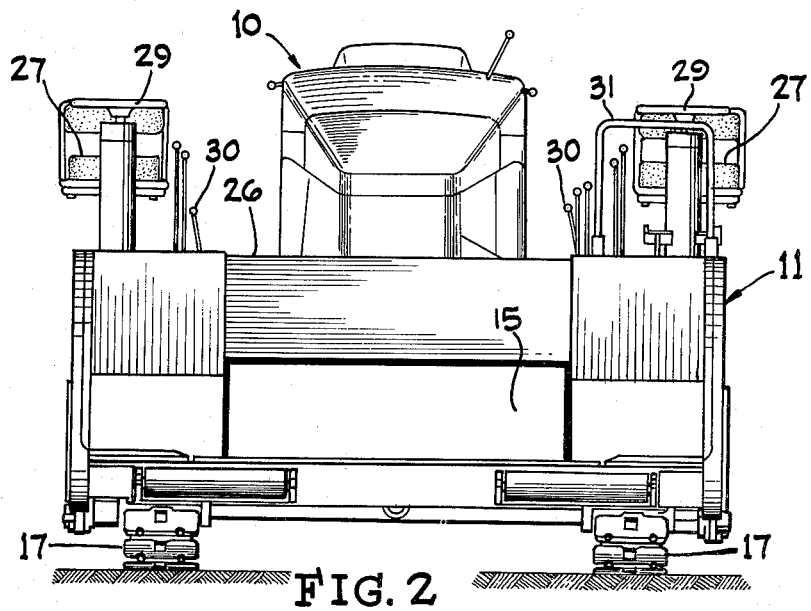
FIGURE 2 is a front end view of the machine shown in FIGURE 1.

An elevated operator's platform 26 extends over the rear portion of a hopper 15 and has operator's seats 27 at opposite sides thereof, adjacent the rear end of the machine. A steering wheel 29 accessible from each operator's seat, and the usual control levers are provided including individual shifting levers 30 for each seat, for shifting the steering control to high or low speed steering ratio. The steering wheel 29 on the side of the machine, shown in FIGURE 2 as being the left hand side of the machine, has a guard rail 31 spaced from the side thereof opposite the seat 27. The guard rail 31 is provided as a guard and rest for the operator of the machine to accommodate the operator to stand on the platform 26, on the opposite side thereof from the seat 27, when it is desired to reverse the direction of travel of the paver finisher. During reverse travel of the paver finisher, the operator may leave his seat and face in the direction of travel and steer by turning the wheel 29 in the direction it is desired to turn.

The operator's platform 26 also forms a support for an engine 32, which may be an internal combustion engine of a well known form, a clutch 33 and a transmission 35 driven by the engine 32 under the control of the clutch 33. The transmission 35 may be of any well known form and drives a power steering and drive transmission 36 through a chain and sprocket drive 37, driving a main shaft 39 for the power steering and drive transmission 36.

The traction wheels 12 are mounted on axles 40, rotatably journalled in an inner end wall 41 of a gear housing 43, for reduction gearing, indicated generally by a reference character 45. The reduction gearing 45 drives the two axles 40 and the wheels 12 thereon at the same rates of speed from a central drive shaft 46, coaxial with the axis of rocking movement of the gear housing 43 on the main frame 11, as shown and described in the aforementioned application Serial No. 838,284. The shaft 46 has a drive sprocket 47 keyed or otherwise secured to the outer end portion thereof and driven from a drive sprocket 49 of the steering and drive transmission 36, through a drive chain 50.

Each gear housing 43 has a generally cylindrical casing portion 51 partially enclosing the drive sprocket 47, and open at its upper end portion to accommodate the chain 50 to pass about and mesh with the sprocket 47. The casing 51 has an end plate 53, welded or otherwise secured to the outer end thereof, having a pivot shaft 55 secured thereto and extending outwardly therefrom. The pivot shaft 55 is rotatably journalled coaxial with the drive shaft 46 and pivot 24 for the auxiliary arm 23 in a bearing block 56. The pivot shafts 55 being coaxial with the drive shafts 46, thus mount the main frame 11 on the housings 43 and traction wheels 12 for rocking movement about the drive shafts 46. The main frame 11 is stabilized and normally retained from rocking movement about the axes of the drive shafts 46, by a suitable stabilizing means, such as is shown and described in the aforementioned application Serial No. 838,284, so not herein shown or described further.

Figure 4:
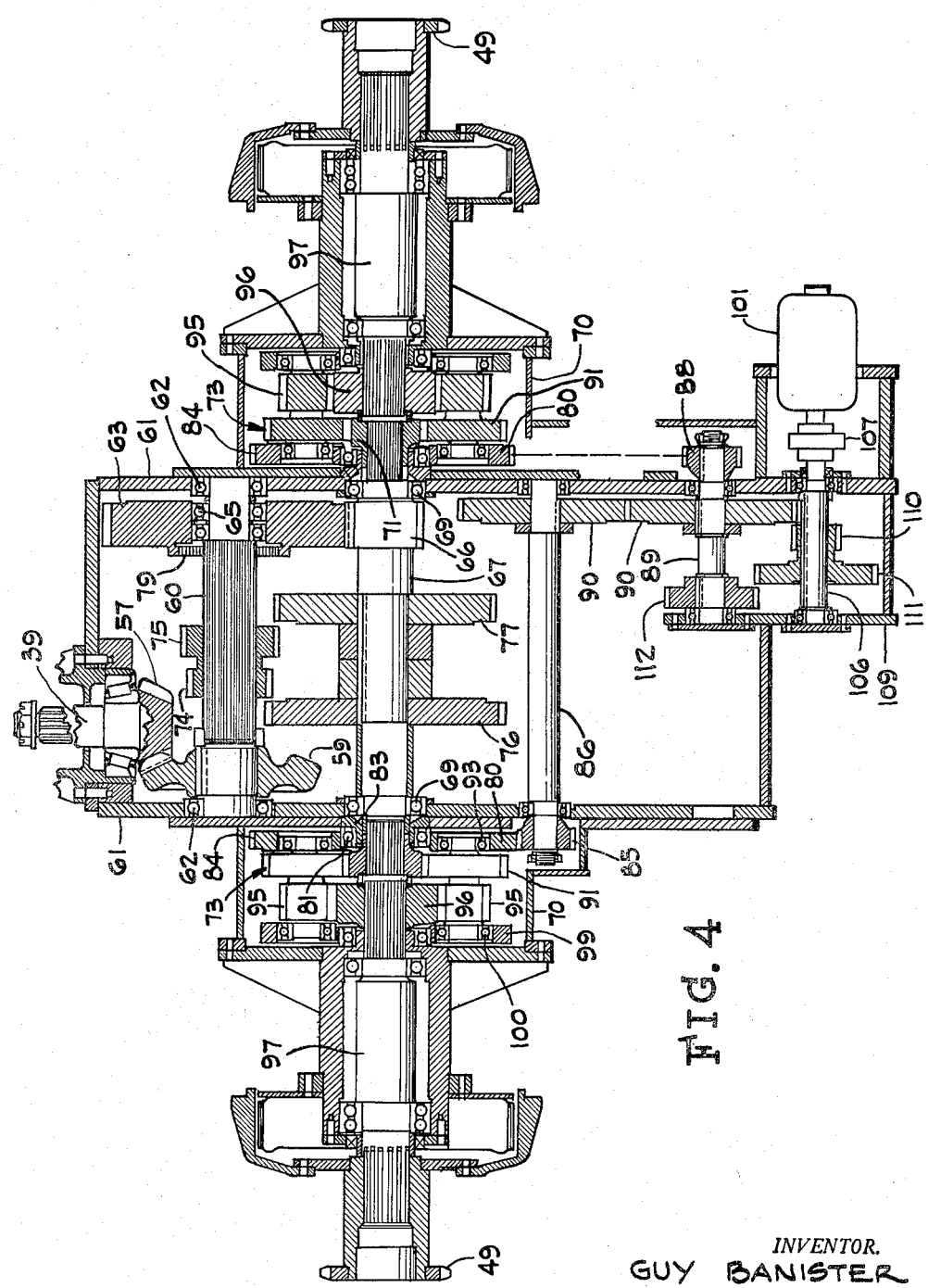
FIGURE 4 is a fragmentary expanded horizontal sectional view taken through the steering transmission, with certain parts thereof shown diagrammatically.

Referring now in particular to the steering and drive transmission 36 for driving the wheels 12 and steering the paver finisher, the main drive shaft 39, as shown in FIGURE 4, has a bevel pinion 57, keyed or otherwise secured thereto. The bevel pinion 57 meshes with and drives a bevel gear 59 keyed or otherwise secured to a transverse shaft 60, for driving said shaft.

The transverse shaft 60 is journalled at its ends in side frame members 61 of the casing for the transmission 36, on ball bearings 62 and has a spur gear 63 rotatably mounted thereon on ball bearings 65. The spur gear 63 meshes with and drives a spur pinion 66 on a transverse drive shaft 67, for driving said shaft at a relatively high rate of speed. The shaft 67 is journalled in the side frame members 61 on the ball bearings 69 and has opposite splined end portions extending outwardly of the side frame members 61 into housings 70 for epicyclic or planetary geared reduction trains. Input sun pinions 71 of planetary geared reduction devices 73 are splined on opposite ends of the shaft 67 for driving said planetary geared reduction devices to effect individual drives to the sprockets 49 through said planetary geared reduction devices at the same rates of speeds and at varying rates of speed, the output speeds of each planetary varying in reverse order.

The shaft 60 has connected pinions 74 and 75 of different pitch diameters splined thereon and movable axially therealong. The pinion 74 is adapted to mesh with a spur gear 76 keyed or otherwise secured to the drive shaft 67 for driving said shaft at a low rate of speed. The spur pinion 75 is adapted to mesh with a spur gear 77 keyed or otherwise secured to the drive shaft 67 for driving said shaft at a higher rate of speed.

The spur gear 63 has internal gear teeth 79 on the inner face thereof adapted to be meshed with the teeth of the spur gear 75 to effect a drive to the shaft 67 for driving said shaft at a relatively high rate of speed. The connected pinions 74 and 75 may be shifted along the shaft 60 to effect a drive to the shaft 67 at a low speed through the spur gear 76, a higher speed through the spur gear 77 and a high tramming speed through the spur gear 63 by operation of a shifting collar or the like (not shown), which may be operated by suitable control levers accessible from either of the operator's seats 27.

Referring now in particular to the epicyclic or planetary geared reduction devices 73 each of said geared reduction devices includes a reaction or control member 80 mounted coaxial with the shaft 67 for free rotation with respect to said shaft on ball bearings 81 mounted in an annular carrier 83 secured to the side frame member 61 and extending outwardly therefrom along the shaft 67.

The reaction members 80 have gear teeth 84 extending about their periphery. The gear teeth 84 of one reaction member, shown in FIGURE 4 as being the left hand reaction member, mesh with a spur control pinion 85 on a control shaft 86. The gear teeth 84 on the opposite reaction member 80 mesh with a control pinion 88 on a transverse shaft 89. The transverse shaft 89 has drive connection with the control shaft 86 through meshing spur gears 90 of the same pitch diameters, keyed or otherwise secured to said shafts. For illustrative purposes the motor 101 and pinion 88 are shown as expanded or rolled out with respect to the planetaries 73. When, however, the pinion 88 is rolled in, it will mesh with the reaction member 80. The spur pinions 85 and 88 are of the same pitch diameters driven in opposite directions to rotate the reaction members 80 in opposite directions and thereby vary the speeds of the opposite planetaries 73 in reverse orders.

Each reaction member 80 has a series of planetary pinions 91 rotatably mounted thereon on ball bearings 93 and meshing with and driven from the sun gear 71. The planetary pinions 91 have planetary pinions 95 formed integrally therewith and spaced outwardly therefrom, and meshing with and driving an output sun gear 96 splined or otherwise secured to a transverse shaft 97 coaxial with the shaft 67 and having the sprocket 49 splined thereon. The planetary pinions 95 are journalled at their ends opposite the planetary pinions 91 in a cage 99 on ball bearings 100. The cage 99 in turn is journalled for free rotation about the axis of the shaft 97.

When the shaft 67 is driven at the speed selected by the operator of the machine and the shaft 89 is held from rotation, as when a steering motor 101, for driving said shaft, is in a locked position, the reactions of the reaction or control members 80 on the shaft 89 will tend to rotate said shaft in opposite directions due to the reverse drive from the shaft 89, driving one reaction member in one direction and the other reaction member in an opposite direction. The steering motor 101 will then lock the reaction members 80 from rotation and the shaft 97 and sprockets 49 will be driven through the input sun gears 71, the planetary pinions 91, the coaxial planetary pinions 95 and output sun gears 96. This will effect drives to the traction wheels 12 on each side of the machine at the same rates of speed, and will effect travel of the paver finisher in a straight line direction.

When the shaft 89 is driven in one direction, it will effect rotation of one reaction member 80 in one direction and of the opposite reaction member 80 in an opposite direction. This will reduce the speed of rotation of one output sun gear 96 and increase the speed of rotation of the other output sun gear 96 in an obvious manner. The machine will then turn about the traction wheels traveling at the lower rate of speed.

The steering motor 101 may be any well known form of variable speed reversible motor, such as an electric motor or a hydraulic motor, and is herein shown as being a hydraulic motor driven under the control of the steering wheel 29 and reverse and speed control valves 103 and 105 respectively, operated thereby.

The motor 101 is coupled to a shaft 106, parallel to the shaft 89 by a coupling member 107, for driving the shaft 106 in a selected direction and speed. The shaft 106 is journalled at one end in the side frame member 61 for the transmission housing, and at its opposite end in a plate or frame member 109 of the transmission housing, and has a connected spur pinion 110 and spur gear 111 feather keyed thereto. The spur gear and pinion 110 and 111 may be slidably moved along the shaft 106 by operation of a suitable clutch collar, to mesh the spur pinion 110 with the spur gear 90 and effect a drive to the shafts 86 and 89 at a relatively low rate of speed, and to mesh the spur gear 111 with a spur gear 112 keyed or otherwise secured to the shaft 89, to effect a drive to the shafts 86 and 89 at a higher rate of speed.

It should here be understood that the faster the output speeds of the planetary geared reduction devices, that the slower the motor 101 will be turning relative to the speeds of the planetary gears, and the less the motor can control the speed ratios of the two sides of the machine. Less steering response would thus be attained as the travel speed increases, if the low speed ratio were to be used for tramming.

It may thus be seen that either high or low steering ratios may be selected, the low steering ratio being used when the machine is paving. This has the effect of gearing the steering wheel 29 down and requiring a greater amount of steering wheel rotation in order to achieve the same sharpness of radius of turn that may be achieved by the high steering ratio. The high steering ratio is used at relatively high speed travel of the paver where it is traveling from working place to working place and compensates for the relative difference in speeds between the motor 101 and planetary geared reduction devices at high speed travel of the machine.

Figure 6:
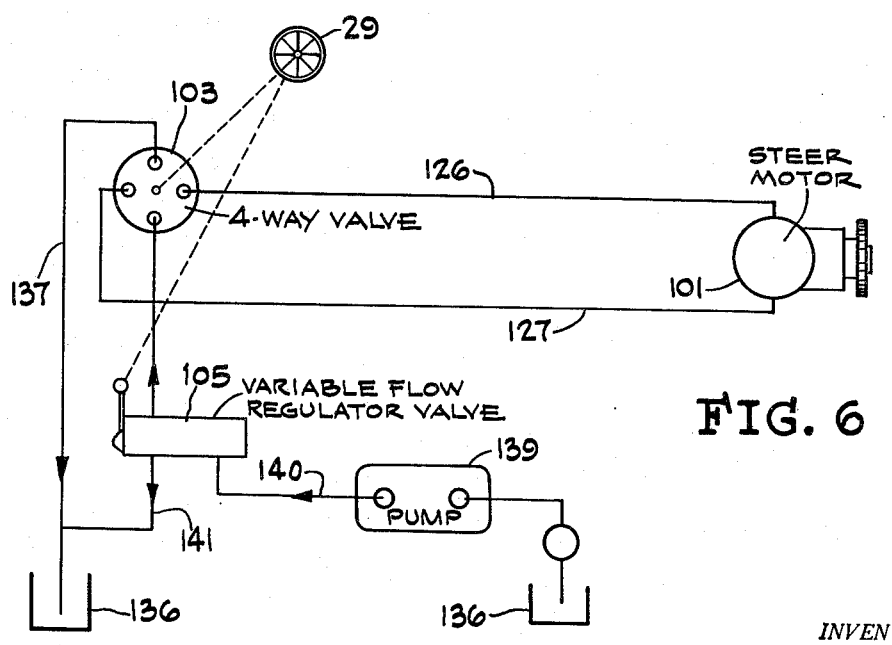
FIGURE 6 is a diagrammatic view, showing an illustrative form of fluid diagram for operating and controlling operation of the steering motor.
Figure 5:
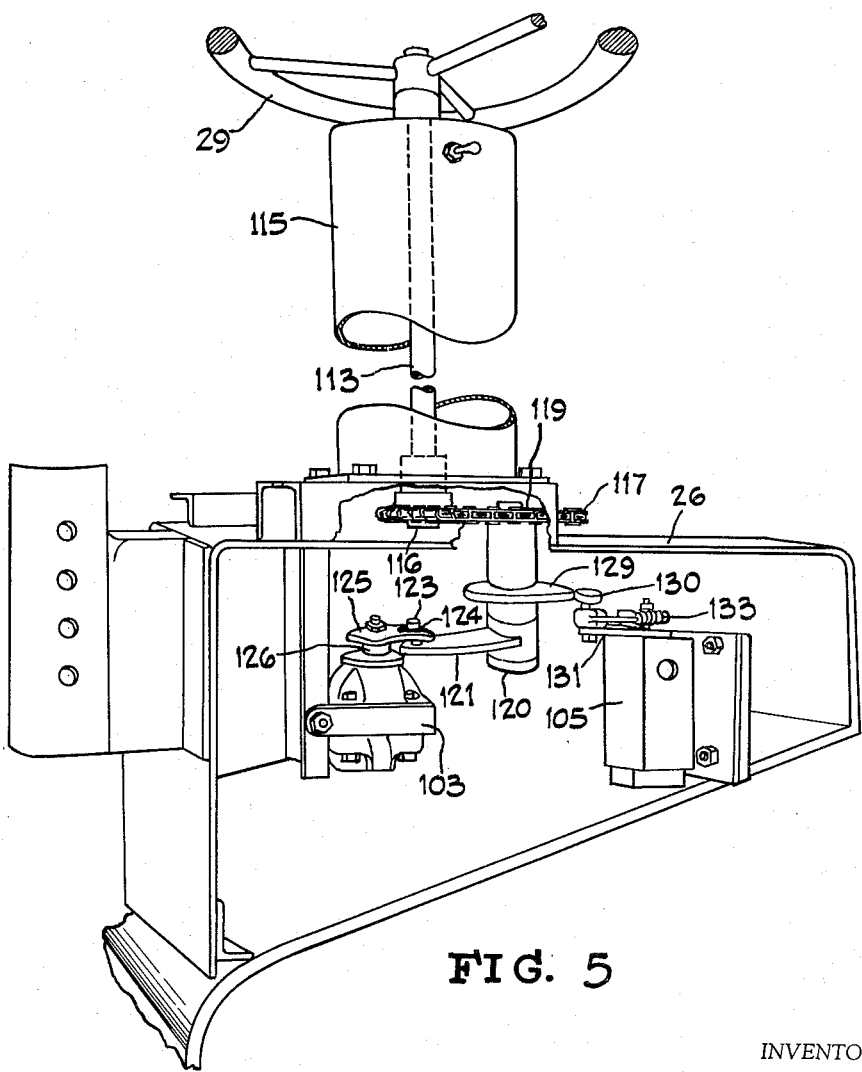
FIGURE 5 is a fragmentary generally perspective view showing the steering wheel and an illustrative form of control connection therefor, for effecting steering of the paver finisher.

Referring now to FIGURES 5 and 6, the steering wheel 29 is mounted on a steering column 113 extending within a cylindrical housing 115 extending upwardly from the platform 26. The steering column 113 is suitably journalled on the platform 26 and has a sprocket 116 on its lower end meshing with a chain 117 driving a sprocket 119 on a control shaft 120. The control shaft 120 has a lever arm 121 extending therefrom. An upright pin 123 is mounted on the outer end portion of the lever arm 121 and extends upwardly therefrom through a slot 124, opening to the outer end of a lever 125 on a valve shaft 126, for rotating said valve shaft and moving the valve 103 into position to supply fluid under pressure to the hydraulic steering motor 101 in one direction through a pressure line 126, or to supply fluid under pressure to the hydraulic motor through a pressure line 217, to reverse direction of rotation of said motor. The valve 103 may be of any well known form, and is herein shown as being an open center rotary valve of a well known form and is no part of the present invention so not herein shown or described further.

The control shaft 120 also has a cam 129 mounted thereon engaging a follower 130 mounted on the end of an arm 131 for operating the variable regulator valve 105, for varying the flow of hydraulic fluid to the valve 103 and steering motor 101, and thereby varying the speed of rotation of said steering motor. A spring 133 is provided to bias the follower 130 into engagement with the cam 127.

The valve 105 may be a well known form of variable flow regulator giving an infinite delivery range of hydraulic fluid under pressure between zero g.p.m. and the maximum g.p.m. available at the source of supply of fluid under pressure, to effect a drive to the hydraulic motor 101 at varying rates of speed from zero to the rated speed of the hydraulic motor. The valve 105 is no part of the present invention, so need not herein be shown or described further.

The connection from the lever 121 to the lever 125 is such that when the steering wheel is in a neutral or straight ahead position, no hydraulic fluid will be supplied to the steering motor 101 and the hydraulic motor will be locked from rotation. A very slight movement of the steering wheel 29, however, will operate the valve 103 to supply hydraulic fluid to the steering motor 101 through either of the pressure lines 126 or 127, depending upon the direction the steering wheel is turned, and to return hydraulic fluid to a tank 136 through a return line 137. As the steering wheel 29 is turned in one direction or another, the flow regulator valve 105 will be gradually opened, increasing the supply of hydraulic fluid to the steering motor 101 as the steering wheel is turned farther in one direction or another. Fluid under pressure is supplied to the valve 105 by a pump 139 and pressure line 140. A by-pass line 141 is provided to return fluid under pressure from the valve 105 to the tank 136 to by-pass the fluid in excess of regulated flow back to tank.

When it is desired to pivot the machine about its own center, the clutch 33 may be disengaged. The drive shaft 39 will then be disconnected from the engine 32. The steering wheel 29 may then be turned in the direction it is desired to steer. This will effect the supply of fluid under pressure to the steering motor 101, to drive the reaction members 80, 80 in opposite directions, and thereby drive one pair of traction devices 12 in one direction and the opposite pair of traction devices 12 in an opposite direction through the two planetary geared reduction devices 73.

It may be seen from the foregoing that an improved form of skid steer power steering system has been provided which gives the uniformity and fineness in steering required for asphalt paver finishers and the like, in which individual epicyclic or planetary gear trains are provided for driving the traction devices on each side of the machine, and in which steering is attained by speeding up the drive through one planetary geared reduction device and slowing down the drive through the other planetary geared reduction device, by rotating the reaction members of the planetary geared reduction devices in opposite directions.

It may further be seen that the fineness in control is attained by varying the speed of rotation of the steering motor from zero to its rated speed, and that when the steering wheel is in a straight ahead position, no hydraulic fluid will flow to the steering motor, and the motor will be locked and the reverse gearing driving the reaction members of the planetaries, will lock the reaction members from rotation and effect travel of the paver finisher in a straight ahead direction.

It may still further be seen that where it is desired to turn the paver finisher about its own center, that the steering motor is effective to drive the traction devices on each side of the machine in opposite directions at the same rates of speed.

Thus, the rate at which the steering motor 101 operates governs the differential in speed of the traction devices on each side of the paver finisher, giving a controlled radius of curvature from infinity to a desired maximum and during turning in either direction, the plentary geared reduction devices provide a true differential action between the traction devices on each side of the machine.

While I have herein shown and described one form in which my invention may be embodied, it should be understood that various modifications and variations in the invention may be attained without departing from the spirit and scope of the novel concepts thereof as defined by the claims appended hereto.

I claim as my invention:

1. In a skid steer power steering system, a main frame, traction devices on each side of said main frame for supporting and propelling said main frame, a main drive motor, drive connections from said drive motor to said traction devices comprising two planetary geared reduction devices, each driven by said motor and each having driving connection with one of said drive shafts, a reversible steering motor, control connections from said reversible steering motor to said planetary geared reduction devices for increasing the driving speed of one planetary geared reduction device and decreasing the driving speed of the other planetary geared reduction device, and for reversing the order of increase and decrease in the speeds of said planetary geared reduction devices, a steering wheel and means operated by said steering wheel for effecting the operation of said reversible motor at varying speeds in forward and reverse directions to effect steering in one direction or another about a selected arc and for holding said motor from rotation to effect steering in a straight ahead direction.

2. In a skid steer power steering system, a main frame, laterally spaced traction devices for supporting and propelling said main frame, a main motor, drive connections from said main motor to said traction devices including individual planetary geared reduction devices for each of said traction devices, a rotatable reaction member for varying the speed of each planetary geared reduction device, a reversible variable speed steering motor, drive connections from said steering motor to said reaction members for driving said reaction members in opposite directions, a steering wheel, and means operated by said steering wheel for effecting the operation of said motor in reverse directions and at varying speeds and for rendering said motor ineffective to operate, said reverse gearing cooperating with said steering motor to lock said reaction members from rotation when said steering motor is not in operation, to effect travel in a straight ahead direction.

3. In a skid steer power steering system particularly adapted for road pavers and the like having a main frame and laterally spaced traction devices for supporting and propelling said main frame, a main drive motor, a transmission shaft driven thereby, individual planetary geared reduction devices driven by said transmission shaft having reaction members, input sun gears, planetary pinions carried by said reaction members and driven by said sun gears, output sun gears for driving said traction devices, and output planetary pinions coaxial with said first mentioned planetary pinions for driving said output sun gears, a steering motor, reverse-gearing driven from said steering motor and having driving connection with said reaction members for driving said reaction members in opposite directions, a steering wheel and means operated by operation of said steering wheel for holding said steering motor from operation to effect steering in a straight ahead direction, reversing the direction of rotation of said steering motor, and varying the speed of rotation thereof for effecting steering in a selected direction about a selected arc.

4. In a skid steer power steering system particularly adapted for road pavers and the like having a main frame and laterally spaced traction devices for supporting and propelling said main frame, a main drive motor, a transmission shaft driven thereby, individual planetary geared reduction devices driven by said transmission shaft having reaction members, input sun gears, planetary pinions carried by said reaction members and driven by said sun gears, output sun gears for driving said traction devices, and output planetary pinions coaxial with said first mentioned planetary pinions for driving said output sun gears, a steering motor, a geared drive connection from said steering motor to said reaction members for driving said reaction members in opposite directions, a steering wheel and means operated by operation of said steering wheel for holding said steering motor from operation, reversing the direction of rotation of said steering motor, and varying the speed of rotation thereof for effecting steering in a selected direction, the geared drive connection from said steering motor to said reaction devices comprising two speed gearing, operable independently of said steering wheel, for effecting fast and slow response to steering for high and low speed operation.

References Cited in the file of this patent

UNITED STATES PATENTS

| 1,621,915 | Weston | Mar. 22, 1927 |
| 1,837,803 | Weston | Dec. 22, 1931 |
| 2,047,050 | Armington | July 7, 1936 |
| 2,400,728 | Akers | May 21, 1946 |